(12) United States Patent
Coroiu et al.

(10) Patent No.: US 11,151,249 B2
(45) Date of Patent: Oct. 19, 2021

(54) APPLICATIONS OF A BINARY SEARCH ENGINE BASED ON AN INVERTED INDEX OF BYTE SEQUENCES

(71) Applicant: CrowdStrike, Inc., Irvine, CA (US)

(72) Inventors: Horea Coroiu, Cluj-Napoca (RO); Daniel Radu, Bucharest (RO)

(73) Assignee: CrowdStrike, Inc., Irvine, CA (US)

( * ) Notice: Subject to any disclaimer, the term of this patent is extended or adjusted under 35 U.S.C. 154(b) by 295 days.

(21) Appl. No.: 15/858,497

(22) Filed: Dec. 29, 2017

(65) Prior Publication Data

US 2018/0196944 A1 Jul. 12, 2018

Related U.S. Application Data

(63) Continuation-in-part of application No. 15/400,561, filed on Jan. 6, 2017, now Pat. No. 10,430,585.

(51) Int. Cl.
*G06F 21/56* (2013.01)
*G06F 16/13* (2019.01)
*G06F 16/14* (2019.01)
*G06F 40/211* (2020.01)

(52) U.S. Cl.
CPC ............ *G06F 21/565* (2013.01); *G06F 16/13* (2019.01); *G06F 16/152* (2019.01); *G06F 21/564* (2013.01); *G06F 40/211* (2020.01)

(58) Field of Classification Search
CPC ...... G06F 21/564; G06F 21/565; G06F 16/13; G06F 16/152; G06F 16/22; G06F 16/24; G06F 16/245; G06F 16/2455; G06F 16/319; G06F 16/901; G06F 40/211; G06F 2221/033; H04L 63/1416
See application file for complete search history.

(56) References Cited

U.S. PATENT DOCUMENTS

| | | | |
|---|---|---|---|
| 6,633,867 B1 | 10/2003 | Kraft et al. | |
| 8,843,493 B1 * | 9/2014 | Liao | G06F 16/319 707/737 |
| 9,501,506 B1 | 11/2016 | Fontoura et al. | |
| 9,910,986 B1 | 3/2018 | Saxe et al. | |
| 2004/0064442 A1 | 4/2004 | Popovitch | |

(Continued)

OTHER PUBLICATIONS

Jain et al., Byte Level n-Gram Analysis for Malware Detection, Springer-Verlag, 2011.*

(Continued)

*Primary Examiner* — Minh Dinh
(74) *Attorney, Agent, or Firm* — Lee & Hayes, P.C.

(57) ABSTRACT

Techniques for searching an inverted index associating byte sequences of a fixed length and files that contain those byte sequences are described herein. Byte sequences comprising a search query are determined and searched in the inverted index. In some examples, the inverted index may be distributed across multiple computers and the search may be performed in parallel. In some examples, a search query may be submitted as expressions comprising query language or regular expressions that are interpreted as search terms, transformed into byte sequences, and searched for in the inverted index. In some examples, an automatic notification request for a search query may be processed and notifications may be sent based on a default or preferred frequency and method.

20 Claims, 14 Drawing Sheets

(56) References Cited

U.S. PATENT DOCUMENTS

| | | |
|---|---|---|
| 2007/0050384 A1 | 3/2007 | Whang et al. |
| 2008/0133565 A1 | 6/2008 | Yasuda et al. |
| 2014/0089258 A1 | 3/2014 | She |
| 2016/0124966 A1 | 5/2016 | Cohen |
| 2016/0267270 A1 | 9/2016 | Lee et al. |
| 2016/0335286 A1 | 11/2016 | Desineni et al. |
| 2017/0068732 A1 | 3/2017 | Newman et al. |
| 2017/0262633 A1 | 9/2017 | Miserendino et al. |
| 2018/0196943 A1 | 7/2018 | Coroiu et al. |
| 2019/0156030 A1 | 5/2019 | Coroiu et al. |
| 2019/0156031 A1 | 5/2019 | Coroiu et al. |
| 2019/0156032 A1 | 5/2019 | Coroiu et al. |
| 2019/0266141 A1 | 8/2019 | Coroiu et al. |
| 2020/0159923 A1 | 5/2020 | Coroiu et al. |

OTHER PUBLICATIONS

Kolter, et al., Learning to Detect Malicious Executables in the Wild, ACM, 2004.*
Raff et al., An investigation of byte n-gram features for malware classification, Springer-Velag, 2016.*
Coulouris et al., Distributed Systems—Concepts and Design, 2001, Addison Wesley, Third Edition, pp. 31-47.*
Ebringer, "Bindex 2.0," Virus Bulletin, retrieved from <<https://www.virusbulletin.com/conference/vb2011/abstracts/bindex-2-0/>> on Jan. 6, 2017, 1 page.
"GitHub—CrowdStrike/CrowdFMS: CrowdStrike Feed Management System," retrieved from https://github.com./CrowdStrike/CrowdFMS on Dec. 28, 2017, 2 pages.
SourceForge, "ssdeep—Latest version 2.13," retrieved from <<http://ssdeep.sourceforge.net/>> on Jan. 6, 2017, last updated Apr. 24, 2015, 3 pages.
"Writing Yara Rules," Yara, published 2014, retrieved from http://yara.readthedocs.io/en/v3.7.0/ writingrules.html, on Dec. 28, 2017, 23 pages.
"Yara," Wikipedia, retrieved from https://en.wikipedia.org/wiki/YARA, on Dec. 28, 2017, 1 page.
Extended European Search Report from the European Patent Office for Application No. 18248145.7, dated Sep. 9, 2019, a counterpart foreign application of U.S. Appl. No. 15/858,497, 20 pages.
Jin, et al., "A Scalable Search Index for Binary Files", 2012 7th International Conference on Malicious and Unwanted Software, IEEE, Oct. 16, 2012, pp. 94-103.
Somil, et al., "Parallel Inverted Index for Large-Scale, Dynamic Digital Libraries", retrieved at <<URL:http://citeseerx.ist.psu.edu/viewdoc/download?doi=10.1.1.605.6679&rep=rep1&type=pdf>>, Jan. 25, 2001, 100 pages.

French, "Fuzzy Hashing Techniques in Applied Malware Analysis", retrieved on Mar. 31, 2019 at <https://insights.sei.cmu.edu/sei_blog2011/03/fuzzy-hashing-techniques-in-applied-malware-analysis.html>, Carnegie Mellon University, Mar. 28, 2011, pp. 1-2.
Karbab, et. al., "Fingerprinting Android packaging: Generating DNAs for malware detection", Digital Investigation, vol. 18, 2016, pp. S33-S45.
Lee, et al., "Using Syntactic Information in Handling Natural Language Queries for Extended Boolean Retrieval Model", Pohang University of Science & Technology, 1999, pp. 1-8.
Li, et. al., "Experimental Study of Fuzzy Hashing in Malware Clustering Analysis", CSET'15 Proceedings of the 8th USENIX Conference on Cyber Security Experimentation and Test, Aug. 2015, pp. 1-8.
Office Action for U.S. Appl. No. 16/252,388, dated Mar. 21, 2019, Coroiu, "Binary Search of Byte Sequences Using Inverted Indices", 7 pages.
Sauer, et al., "Query Processing and Optimization Using Compiler Tools", Proceedings of the 22nd Workshop "Grundlagen von Datenbanken 2010", Jan. 2010, pp. 1-5.
Office Action for U.S. Appl. No. 16/252,359, dated Mar. 7, 2019, Coroiu, "Binary Search of Byte Sequences Using Inverted Indices," 5 pages.
Office Action for U.S. Appl. No. 15/400,561, dated Dec. 14, 2018, Coroiu, "Binary Search of Byte Sequences Using Inverted Indices," 6 pages.
Partial European Search Report from the European Patent Office for Application No. 18248145.7, dated May 24, 2019, a counterpart foreign application of U.S. Appl. No. 15/858,497, 15 pages.
Partial Supplementary European Search Report dated Feb. 16, 2018 for European patent application No. 17207285.2, 11 pages.
Extended European Search Report dated May 22, 2018 for European Patent Application No. 17207285.2, 10 pages.
European Office Action dated Jun. 18, 2020 for European Patent Application No. 17207285.2, a counterpart foreign application of the U.S. Pat. No. 10,430,585, 6 pages.
Extended European Search Report dated Oct. 8, 2020 for European Patent Application No. 20173057.9, a counterpart foreign application of U.S. Appl. No. 16/411,850, 9 pages.
Li, et. al., "ROPNN: Detection of ROP Payloads Using Deep Neural Networks", arxiv.org, Cornell University Library, Jul. 29, 2018, pp. 1-11.
European Office Action dated Apr. 13, 2021 for European Patent Application No. 17207285.2, a counterpart foreign application of U.S. Pat. No. 10,430,585, 6 pages.

* cited by examiner

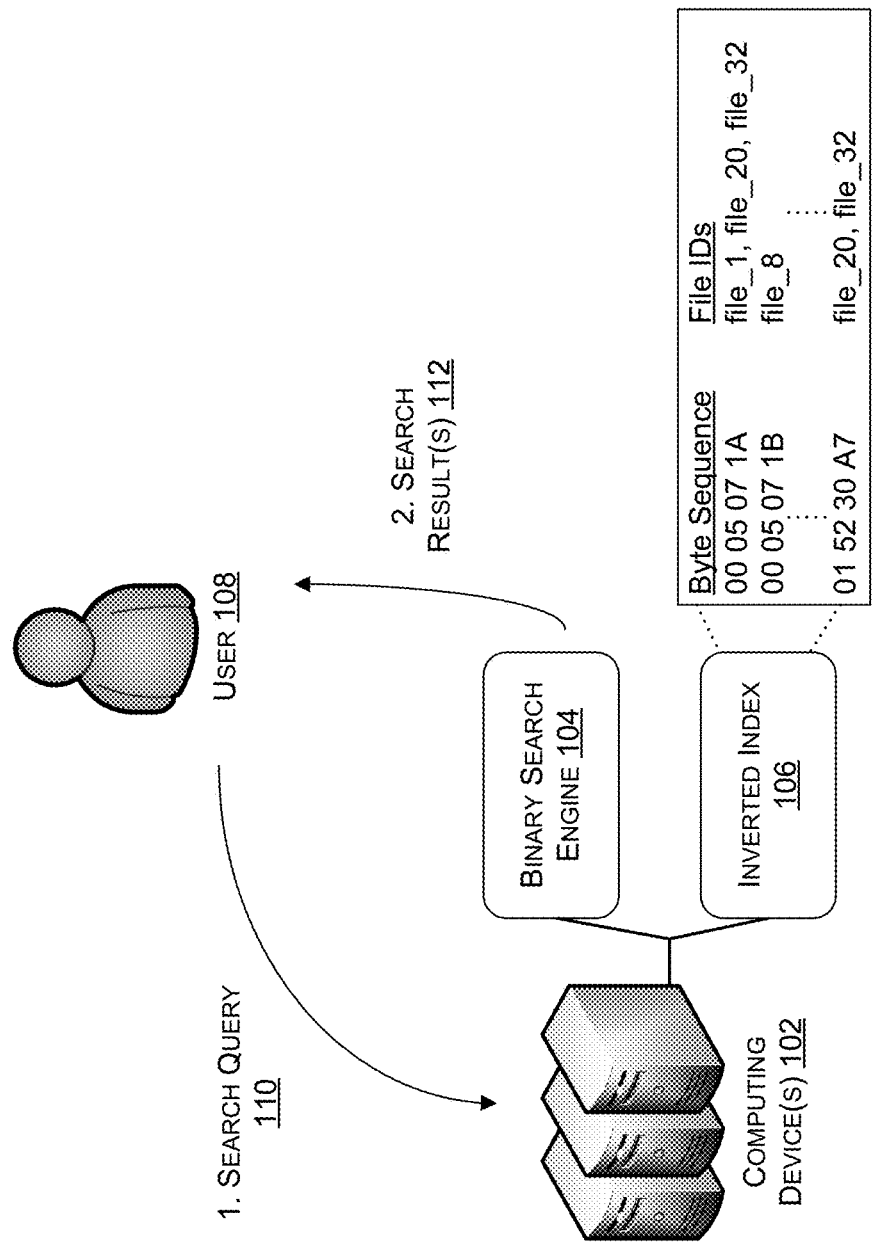

APPLICATIONS OF A BINARY SEARCH ENGINE BASED ON AN INVERTED INDEX OF BYTE SEQUENCES

CROSS REFERENCE TO RELATED APPLICATION

This application is a continuation-in-part of, and claims priority to, co-pending commonly assigned U.S. patent application Ser. No. 15/400,561, entitled "BINARY SEARCH OF BYTE SEQUENCES USING INVERTED INDICES" and filed on Jan. 6, 2017, of which the entire contents are incorporated herein by reference.

BACKGROUND

With computer and Internet use forming an ever greater part of day to day life, security exploits and cyber attacks directed to stealing and destroying computer resources, data, and private information are becoming an increasing problem. For example, "malware", or malicious software, is a general term used to refer to a variety of forms of hostile or intrusive computer programs. Malware is, for example, used by cyber attackers to disrupt computer operations, to access and to steal sensitive information stored on the computer or provided to the computer by a user, or to perform other actions that are harmful to the computer and/or to the user of the computer. Malware may include computer viruses, worms, Trojan horses, ransomware, rootkits, keyloggers, spyware, adware, rogue security software, and other malicious programs and malware may be formatted as executable files, dynamic link libraries (DLLs), scripts, and/or other types of computer programs.

Malware authors or distributors ("adversaries") frequently disguise or obfuscate malware in attempts to evade detection by malware-detection or -removal tools. Consequently, it is time consuming to determine if a program is malware.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 1a-1d illustrate an example overview of computing device(s) configured with a binary search engine and an inverted index that enable searching the contents of binary files and executable files, signature generation, and fuzzy hash generation.

DETAILED DESCRIPTION

Figure 1B:
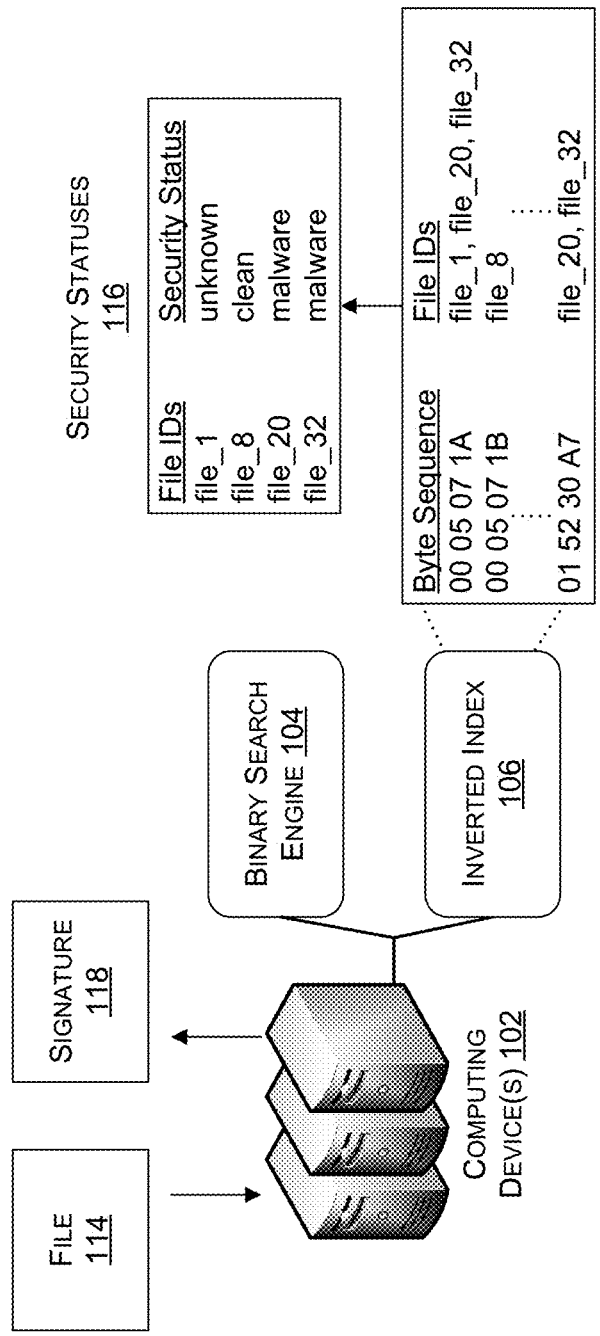

This disclosure describes, in part, techniques for searching an inverted index associating byte sequences of a fixed length and files that contain those byte sequences. Byte sequences comprising a search query are determined and searched in the inverted index, and an intersection of the results is determined and returned as a response to the search query. Further, search queries in the form of expressions including search terms and logical operators are searched in the inverted index and evaluated using a syntax tree constructed based on the logical operators. Also, byte sequences extracted from a file are searched in the inverted index and results of the search are used to generate signatures and fuzzy hashes.

In various implementations, one or more computing devices may generate the inverted index from a corpus of files, such as a corpus of malware files, binary files, executable files, etc. The generating may include specifying at least a subset of byte sequences of the fixed length found in at least one file of the corpus of files and, for each byte sequence in the subset of byte sequences, file identifiers of one or more files in the corpus of files that include that byte sequence. In some implementations, the byte sequences of the fixed length are n-grams with a length of four bytes.

In further implementations, the inverted index may be utilized to generate a signature for a file. For each byte sequence of a fixed length comprising a file, computing device(s) search the inverted index. The inverted index or related data may also specify, for each file identifier, a security status associated with the file of that file identifier. The computing device(s) then create a list of candidate byte sequences based on results of the search in which the candidate byte sequences are only found in files that are associated with a malware status or an unknown status. The computing device(s) select candidate byte sequences that are associated with the most file identifiers and generate a signature from the selected candidate byte sequences.

In some implementations, as noted above, the search query may include an expression, such as an expression including at least two search terms and at least one logical operator. In response to receiving an expression, the computing device(s) may search in the inverted index for each byte sequence of a fixed length that comprises each of the search terms. The computing device(s) then evaluate the results using a syntax tree constructed from the at least one logical operator and return a search result to the search query based on the evaluating.

In various implementations, the computing device(s) may utilize the inverted index to create a fuzzy hash for a file. For each byte sequence of a fixed length comprising a file, the computing device(s) search the inverted index. The computing device(s) then identify a subset of search results that are associated with the fewest file identifiers (but which have more than zero file identifiers) and construct a fuzzy hash from byte sequences comprising the subset. Also, the resulting byte sequences used to construct the fuzzy has may have a different length than the fixed length byte sequences of the inverted index.

Various implementations relate to techniques for searching an inverted index associating byte sequences of a fixed length with files that contain those byte sequences. Byte sequences comprising a search query are determined and searched in the inverted index, and an intersection of the results is determined and returned as a response to the search query. Further, search queries in the form of expressions including search terms and logical operators are searched in the inverted index and evaluated using a syntax tree constructed based on the logical operators. Also, byte sequences comprising a file are searched in the inverted index and results of the search are used to generate signatures and fuzzy hashes.

Example Overview

FIGS. 1a-1d illustrate an example overview of computing device(s) configured with a binary search engine and an inverted index that enable searching the contents of binary files and executable files, signature generation, and fuzzy hash generation.

The computing device(s) 102 illustrated in FIGS. 1a-1d may be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In some implementations, the computing device(s) 102 may represent virtual machines implemented on computing device(s). An example computing device 102 is illustrated in FIG. 2 and described below with reference to that figure.

In various implementations, the computing device(s) 102 may be associated with a security service, a research entity, or may not be associated with any service or entity. As illustrated in FIGS. 1a-1d by the bracket, the computing device(s) 102 may include a binary search engine 104 and an inverted index 106. The inverted index 106 may be constructed from and identify a corpus of files, such as a corpus of malware files obtained by a security service or research efforts. The corpus of files may, however, include any sort of files, such as binary files, executable files, unstructured files, etc. In some implementations, the inverted index may be created by one service or entity and subsequently provided to other service(s) and/or entit(ies).

Additionally, the computing device(s) 102 may comprise a service cluster, a data center, a cloud service, etc., or a part thereof. The binary search engine 104 and the inverted index 106 may each be implemented on single one(s) of the computing device(s) 102, on multiple ones of the computing device(s) 102 (e.g., as multiple instances of the binary search engine 104 or the inverted index 106), distributed among the computing device(s) 102 (e.g., with modules of the binary search engine 104 distributed among the computing device(s) 102 and/or parts of the inverted index 106 distributed among the computing device(s) 102), or any combination thereof. Further, the inverted index 106 may be stored on disk storage of the computing device(s) 102.

In some implementations, the binary search engine 104 illustrated in FIGS. 1a-1d may be configured to accept any sort of query from a user, such as a text/string query, a structured query (e.g., an expression including a logical operator), or a specific byte sequence. The binary search engine 104 may then generate byte sequences of a fixed length from that search query. For example, the binary search engine 104 may identify each possible contiguous byte sequence of a certain length comprising the query. That length may in turn correspond to a fixed length utilized by the inverted index (e.g., a fixed length of four bytes). For example, if the query corresponds to the byte sequence "03 62 D1 34 12 00," the binary search engine 104 may determine the following sequences to be searched: "03 62 D1 34," "62 D1 34 12," and "D1 34 12 00." Upon determining the byte sequences of the fixed length, the binary search engine 104 queries the inverted index 106 for each byte sequence and receives, in return, file identifiers of files that include those byte sequences as file contents. The binary search engine 104 may then take any of a number of further acts described with respect to FIGS. 1a-1d.

In further implementations, either the binary search engine 104 or another component of the computing device(s) 102 may receive a file and determine the byte sequences of the fixed length comprising that file. For example, if the contents of the file are the byte sequence "03 62 D1 34 12 00", the binary search engine 104 or component may determine the following sequences to be searched: "03 62 D1 34", "62 D1 34 12", and "D1 34 12 00". If an additional component performs the receiving and determining, the additional component may then provide the byte sequences to the binary search engine 104. The binary search engine 104 may then query the inverted index 106 for each byte sequence and receive file identifiers in return, as described above. The binary search engine 104 may then take any of a number of further acts described with respect to FIGS. 1a-1d.

In various implementations, the inverted index 106 may specify byte sequences of a fixed length, such as n-gram byte sequences with a fixed length of four bytes (e.g., 4-grams). For each specified byte sequence, the inverted index may also specify one or more file identifiers of files that include that specified byte sequence as file content. FIGS. 1a-1d show an example of such an inverted index 106.

The inverted index 106 may be generated by the binary search engine 104, by another component of the computing device(s) 102, or by other computing device(s) 102. It may be generated or updated periodically from the corpus of files mentioned above. It may also be generated or updated responsive to changes or additions to the corpus of files. To construct the inverted index 106, each byte sequence of the fixed length encountered in one of the files of the corpus of files is added to the byte sequences specified by inverted index 106. Upon encountering a byte sequence, the generating component may determine whether the byte sequence is already specified. If it is specified, the file identifier of the currently processed file is associated with that specified byte sequence. If it is not specified, it is added, and the file identifier of the currently processed file is associated with that added byte sequence.

As illustrated in FIG. 1a, the binary search engine 104 of the computing device(s) 102 may receive from a user 108 a search query 110. The binary search engine 104 may then perform search(es) in the inverted index 106, process results, and respond with a search result 112 to the user 108. The search query 110 may be any of the text/string, structured query/expression, or byte sequence described above. The binary search engine 104 may determine the byte sequences of the fixed length corresponding to the search query 110, query the inverted index for each determined byte sequence, and obtain in response the file identifiers associated with those byte sequences, as described above.

In various implementations, upon obtaining the file identifiers associated with the byte sequences for search query 110, the binary search engine 104 determines an intersection of those results. For example, if the binary search engine 104 searches three byte sequences, and if the first sequence is associated with file identifiers 1, 3, and 4, the second sequence associated with file identifiers 1, 2, and 4, and the third sequence associated with file identifiers 1, 4, and 30, the intersection of the results would include file identifiers 1 and 4. The binary search engine 104 would then return indications of the files associated with file identifiers 1 and 4 as the search results 112.

In some implementations, the binary search engine 104 or other component may perform a further validation operation on the files identified by the intersection of the results. For example, files associated with file identifiers 1 and 4 can be evaluated to ensure that they satisfy the search query 110 before indications of those files are returned as search results 112.

Figure 2:
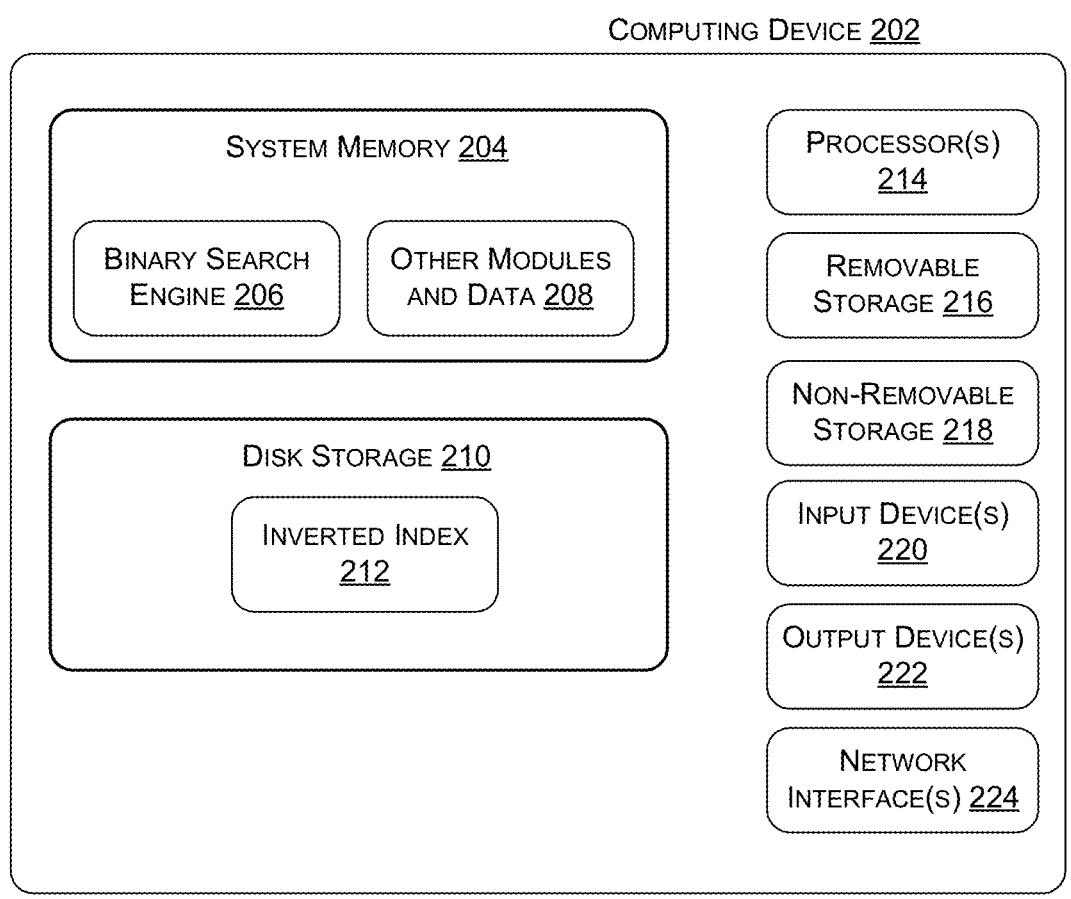
FIG. 2 illustrates a component level view of a computing device configured to implement, in whole or as part of a distributed service, a binary search engine, an inverted index of byte sequences listing files that include those sequences, and other supporting data and logic.

As illustrated in FIG. 1b, computing device(s) 102 may determine the byte sequences of a fixed length comprising a file 114, utilize the binary search engine 104 to search the inverted index 106 for those byte sequences, obtain file identifiers of files including those byte sequences as search results, determine security statuses 116 for those files, identify a subset of the searched byte sequences based on the security statuses 116 and search results, and generate a signature 118 based on the identified byte sequences.

In some implementations, as described above, the binary search engine 104 or another component of the computing device(s) 102 may receive the file 114 and determine the byte sequences of the fixed length comprising that file 114. File 114 may be any sort of file, such as a file of the above-described corpus of files.

Once the byte sequences comprising the file 114 have been determined, the binary search engine 104 searches for each of the byte sequences in the inverted index 106 and receives, as search results, file identifiers associated with each searched byte sequence that is found in the inverted index 106. The binary search engine 104 or another component of the computing device(s) 102 then determines a security status 116 associated with each file identifier. The security statuses 116 may be metadata for the file identifiers and may be found in the inverted index 106 or in another data source. The security status 116 for each file identifier identifies a security status 116 of a file associated with that file identifier. Such a security status 116 may be one of a malware status, a clean status, an unknown status, another status indicating a level of trust.

In further implementations, before searching for each byte sequence comprising the file 114, the binary search engine 104 or other component may filter the byte sequences, removing from the list of byte sequences to be searched any byte sequences known to only be found in files with a clean security status 116. Following the filtering, the binary search engine 104 would proceed with searching the inverted index 106 for the remaining byte sequences.

Following the searches, the binary search engine 104 or other component then creates a list of candidate byte sequences that are only found in files associated with a malware security status 116 or unknown security status 116. If any of the file identifiers associated with a given byte sequence are associated with a clean security status, then that given byte sequence will not be included in the list of candidate byte sequences.

In various implementations, the binary search engine 104 or other component then determines a number of file identifiers associated with each of the candidate byte sequences and selects the top n byte sequences (e.g., top 2 or top 3) with the greatest number of file identifiers. For example, if byte sequence 1 is associated with 10 file identifiers, byte sequence 2 is associated with 1 file identifier, byte sequence 3 is associated with 8 file identifiers, byte sequence 4 is associated with 2 file identifiers, and byte sequence 5 is associated with 1 file identifier, then byte sequences 1 and 3 may be selected.

The binary search engine 104 or other component of the computing device(s) 102 may then generate a signature 118 from the selected ones of the candidate byte sequences and associate that signature 118 with the file 114. In some implementations, the signature 118 may then be shared with a security service to aid in malware detection and analysis.

Figure 1C:
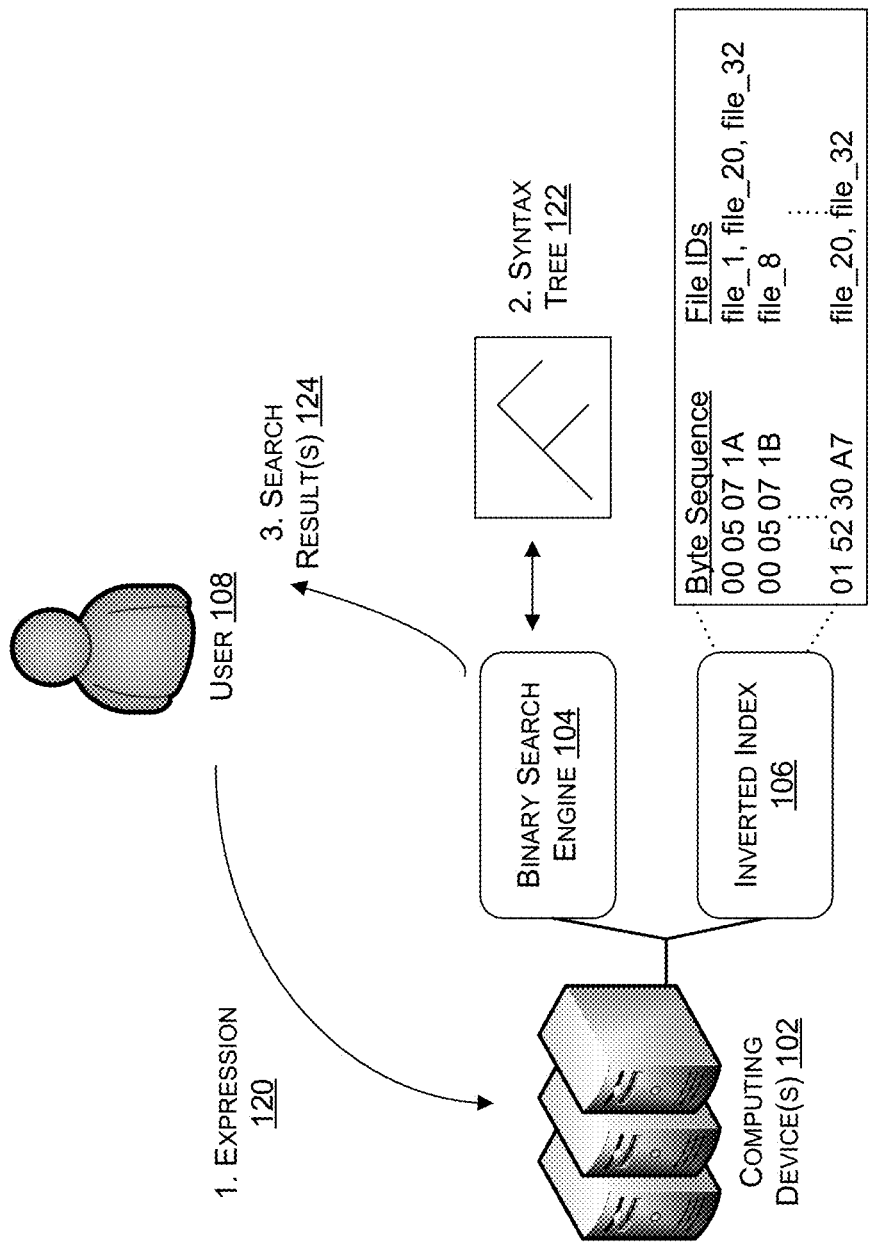

As illustrated in FIG. 1c, the binary search engine 104 of the computing device(s) 102 may receive an expression 120 as a search query from a user 108. The binary search engine 104 may then perform search(es) in the inverted index 106, evaluate the results of the searches using a syntax tree 122 constructed from logical operator(s) included in the expression 120, and respond with a search result 124 to the user 108 based on the evaluating.

The expression 120 may comprise at least two search terms and at least one logical operator. For example, the expression 120 may be something like "includes 'hello' AND 'world.'" In that expression 120, "hello" and "world" are the search terms, and AND is the logical operator. Upon receiving the expression 120, the binary search engine 104 may determine the byte sequences of a fixed length comprising each search term and query the inverted index 106 with those byte sequences.

The binary search engine 104 or another component of the computing device(s) 102 may also construct a syntax tree 122 based on the logical operator(s) included in the expression 120. The search terms of the expression 120 become the leaves of the syntax tree 122.

In various implementations, upon constructing the syntax tree 122 and searching for the byte sequences comprising the search terms, the binary search engine 104 or other component evaluates the results of the searching using the syntax tree 122 to determine search result(s) 124. Those search result(s) 124 are then returned to the user 108.

In some implementations, the binary search engine 104 or other component may perform a validation operation before returning the search result(s) 124 to ensure that each file identified as a search result 124 satisfies the expression 120.

Figure 1D:
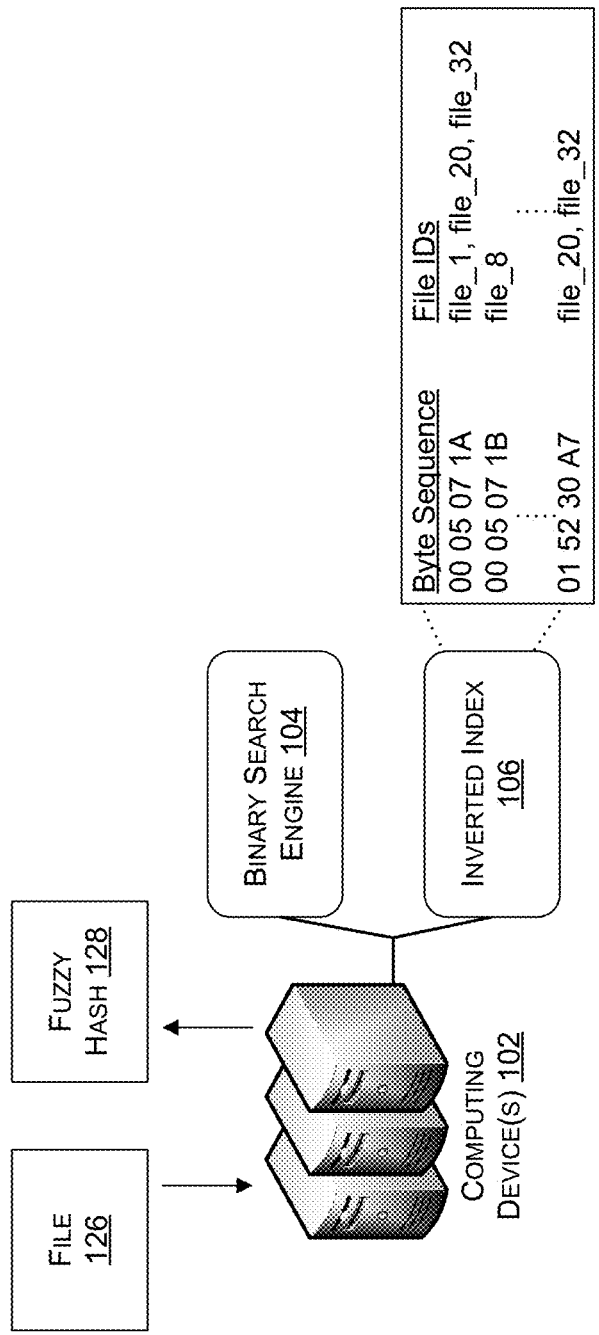

As illustrated in FIG. 1*d*, computing device(s) may determine the byte sequences comprising a file 126, search for those byte sequences in an inverted index 106 using the binary search engine 104, identify ones of the byte sequences that are associated with the fewest file identifiers, and construct a fuzzy hash 128 from those ones of the byte sequences.

In some implementations, as described above, the binary search engine 104 or another component of the computing device(s) 102 may receive the file 126 and determine the byte sequences of the fixed length comprising that file 126. File 126 may be any sort of file, such as a file of the above-described corpus of files.

Once the byte sequences comprising the file 126 have been determined, the binary search engine 104 searches for each of the byte sequences in the inverted index 106 and receives, as search results, file identifiers associated with each searched byte sequence that is found in the inverted index 106.

In various implementations, the binary search engine 104 or other component then determines a number of file identifiers associated with each of the byte sequences and selects the top n byte sequences (e.g., top 2 or top 3) with the fewest number of file identifiers (but which have more than zero file identifiers). For example, if byte sequence 1 is associated with 10 file identifiers, byte sequence 2 is associated with 1 file identifier, byte sequence 3 is associated with 8 file identifiers, byte sequence 4 is associated with 2 file identifiers, and byte sequence 5 is associated with 1 file identifier, then byte sequences 2 and 5 may be selected. The relatedness confidence threshold used in selecting the top n byte sequences may be determined based on a desired level of confidence that a particular byte sequence is relatively unique for the file in which it appears, appearing in that file and its variants but not in other files.

The selected byte sequences are then used to construct a fuzzy hash 128, which may then be provided to security service(s). Also, the length of the byte sequence used for fuzzy hashing may differ from the fixed length of the byte sequences of the inverted index. For example, the inverted index could use byte sequences with a fixed length of four bytes, but the byte sequences used for fuzzy hashing could be of a length of ten bytes.

Example System

FIG. 2 illustrates a component level view of a computing device configured to implement, in whole or as part of a distributed service, a binary search engine, an inverted index of byte sequences listing files that include those sequences, and other supporting data and logic. As illustrated, computing device 202 comprises a system memory 204 storing a binary search engine 206 and other modules and data 208 as well as disk storage 210 storing an inverted index 212. Also, computing device 202 includes processor(s) 214, a removable storage 216 and non-removable storage 218, input device(s) 220, output device(s) 222, and network interfaces 224.

In various embodiments, system memory 204 is volatile (such as RAM), non-volatile (such as ROM, flash memory, etc.) or some combination of the two. The binary search engine 206 is an example of similarly named components further describe herein. Other modules and data 208 support functionality described further with respect to FIGS. 1-6.

Disk storage 210 may comprise data storage device(s) (removable and/or non-removable) such as, for example, magnetic disks, optical disks, or tape. Such storage device(s) may comprise non-volatile memory (such as ROM, flash memory, etc.). The inverted index 212 is an example of similarly named components further describe herein. While the inverted index 212 is shown as being stored on disk storage 210, it is to be understood that the inverted index 212 may be stored wholly or in part in system memory 204 or in any other sort of memory or storage.

In some embodiments, the processor(s) 214 include a central processing unit (CPU), a graphics processing unit (GPU), or both CPU and GPU, or other processing unit or component known in the art.

Computing device 202 also includes additional data storage devices (removable and/or non-removable) such as, for example, magnetic disks, optical disks, or tape. Such additional storage is illustrated in FIG. 2 by removable storage 216 and non-removable storage 218. Non-transitory computer-readable media may include volatile and nonvolatile, removable and non-removable media implemented in any method or technology for storage of information, such as computer readable instructions, data structures, program modules, or other data. System memory 204, disk storage 210, removable storage 216 and non-removable storage 218 are all examples of non-transitory computer-readable storage media. Non-transitory computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing device 202. Any such non-transitory computer-readable media may be part of the computing device 202.

Computing device 202 also has input device(s) 220, such as a keyboard, a mouse, a touch-sensitive display, voice input device, etc., and output device(s) 222 such as a display, speakers, a printer, etc. These devices are well known in the art and need not be discussed at length here.

Computing device 202 also contains network interface 224 capable of communicating with other devices over one or more networks, such as those discussed herein.

Example Processes

FIGS. 3-6 and 8-10 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 3:
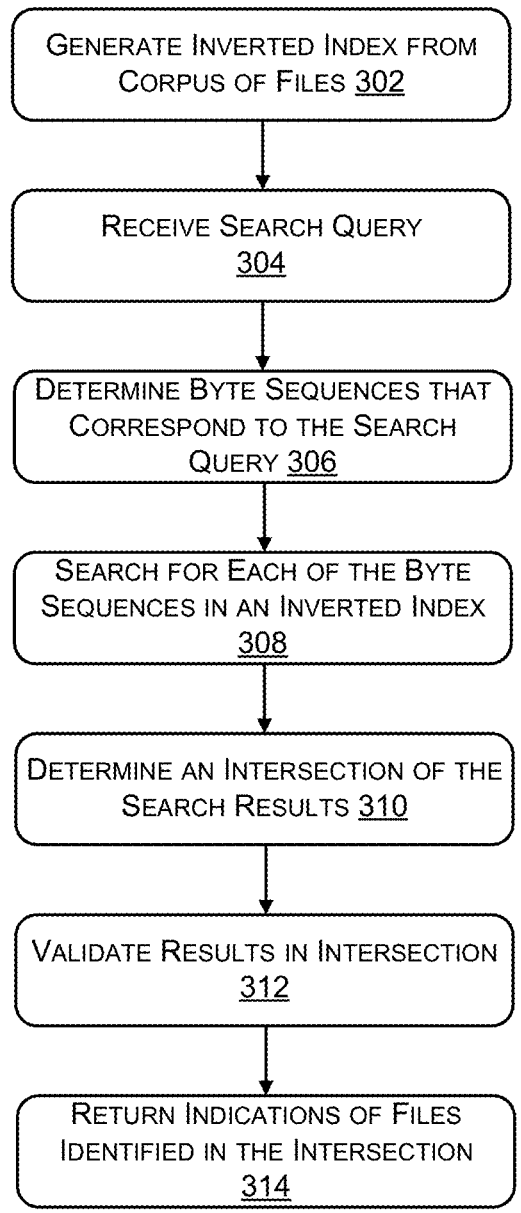
FIG. 3 illustrates example operations associated with the binary search engine, including receiving a search query, searching for byte sequences corresponding to that search query in an inverted index, determining an intersection of the search results, and returning an indication of files identified in the intersection.

FIG. 3 illustrates example operations associated with the binary search engine, including receiving a search query, searching for byte sequences corresponding to that search query in an inverted index, determining an intersection of the search results, and returning an indication of files identified in the intersection.

The operations include, at 302, generating, by a system comprising one or more processors, an inverted index from a corpus of files, such as a corpus of malware files. The files may be binary files or executable files. The generating may include specifying at least a subset of byte sequences of the fixed length found in at least one file of the corpus of files and, for each byte sequence in the subset of byte sequences, file identifiers of one or more files in the corpus of files that include that byte sequence. In some implementations, the byte sequences of the fixed length are n-grams with a length of four bytes. Further, the one or more processors, along with executable instructions for performing the operations shown in FIG. 3, and the inverted index may be distributed across a plurality of computing devices.

At 304, the system may receive a search query.

At 306, the system may determine a plurality of byte sequences of a fixed length that correspond to the search query At 308, the system may search for each of the byte sequences in the inverted index that specifies byte sequences of the fixed length and, for each specified byte sequence, file identifiers of files that include the specified byte sequence.

At 310, the system may determine an intersection of search results of the searching.

At 312, the system may validate that the search results included in the intersection include the search query.

At 314, the system may return indications of files associated with file identifiers that are included in the intersection in response to the search query.

Figure 4:
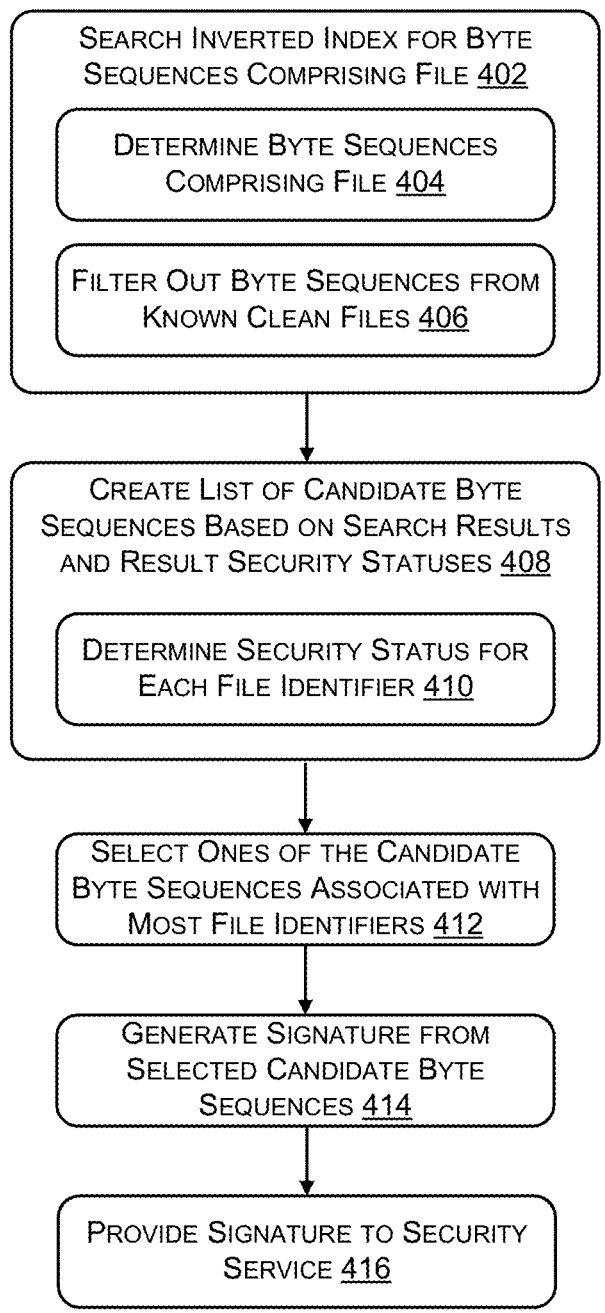
FIG. 4 illustrates example operations associated with the binary search engine, including searching for byte sequences that comprise a file in an inverted index, creating a list of candidate byte sequences from the search results based on security statuses of files associated with those results, selecting candidate byte sequences associated with the most file identifiers, and generating a signature from the candidate byte sequences.

FIG. 4 illustrates example operations associated with the binary search engine, including searching for byte sequences that comprise a file in an inverted index, creating a list of candidate byte sequences from the search results based on security statuses of files associated with those results, selecting candidate byte sequences associated with the most file identifiers, and generating a signature from the candidate byte sequences.

The operations include, at 402, for each byte sequence of a fixed length comprising a file, searching an inverted index which specifies byte sequences of the fixed length and, for each specified byte sequence, file identifiers of files that include the specified byte sequence. In some implementations, the byte sequences of the fixed length are n-grams with a length of four bytes. Further, each file identifier may be associated with a security status. For example, the security status associated with each file identifier may be one of a malware status, a clean status, an unknown status, or another status indicating a level of trust. At 404, the searching also includes determining the byte sequences of the fixed length comprising the file. At 406, the searching further includes filtering out byte sequences known to be found in files with file identifiers associated with a clean status and searching for the remaining byte sequences comprising the file.

At 408, the operations further include, based on results of the searching, creating a list of candidate byte sequences, wherein the candidate byte sequences are only found in files with file identifiers that are associated with a malware status or an unknown status. At 410, the creating may also include determining a security status for each file identifier returned from the searching, the security status being metadata for the file identifier.

At 412, the operations include selecting ones of the candidate byte sequences that are associated with the most file identifiers.

At 414, the operations additionally include generating a signature from selected ones of the candidate byte sequences.

At 416, the operations include providing the signature to a security service.

Figure 5:
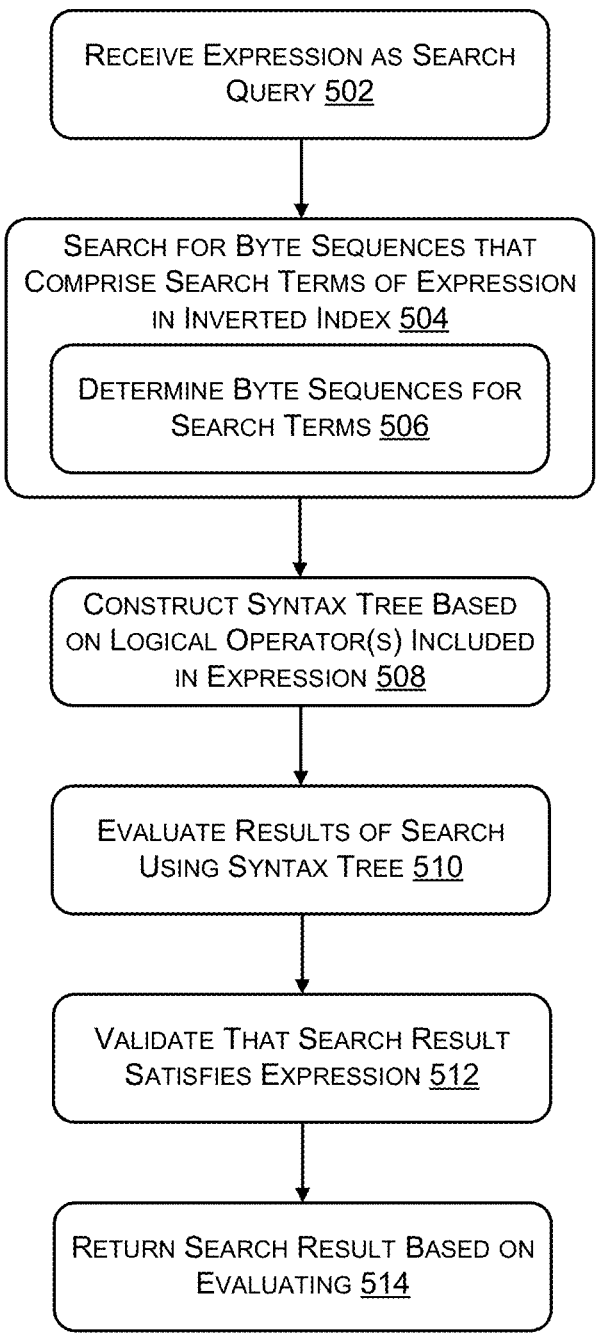
FIG. 5 illustrates example operations associated with the binary search engine, including receiving an expression as a search query, searching for byte sequences corresponding to search terms of the expression in an inverted index, evaluating the search results using a syntax tree constructed from logical operator(s) included in the expression, and returning a search result based on the evaluation.

FIG. 5 illustrates example operations associated with the binary search engine, including receiving an expression as a search query, searching for byte sequences corresponding to search terms of the expression in an inverted index, evaluating the search results using a syntax tree constructed from logical operator(s) included in the expression, and returning a search result based on the evaluating.

The operations include, at 502, receiving an expression as a search query. The expression includes at least one logical operator and at least two search terms.

At 504, the operations further include searching for byte sequences of a fixed length that comprise each of the search terms in an inverted index. The inverted index specifies byte sequences of the fixed length and, for each specified byte sequence, file identifiers of files that include the specified byte sequence. In some implementations, the byte sequences of the fixed length are n-grams with a length of four bytes. At 506, the searching may also include determining a plurality of byte sequences of a fixed length that correspond to each search term.

At 508, the operations include constructing a syntax tree based on the at least one logical operator. The search terms are evaluated as leaves of the syntax tree, each leaf comprising one or more byte sequences associated with one of the search terms.

At 510, the operations additionally include evaluating results of the searching using the syntax tree constructed from the at least one logical operator.

At 512, the operations include validating that a file corresponding to a search result satisfies the expression.

At 514, the operations also include returning the search result to the search query based at least in part on the evaluating.

Figure 6:
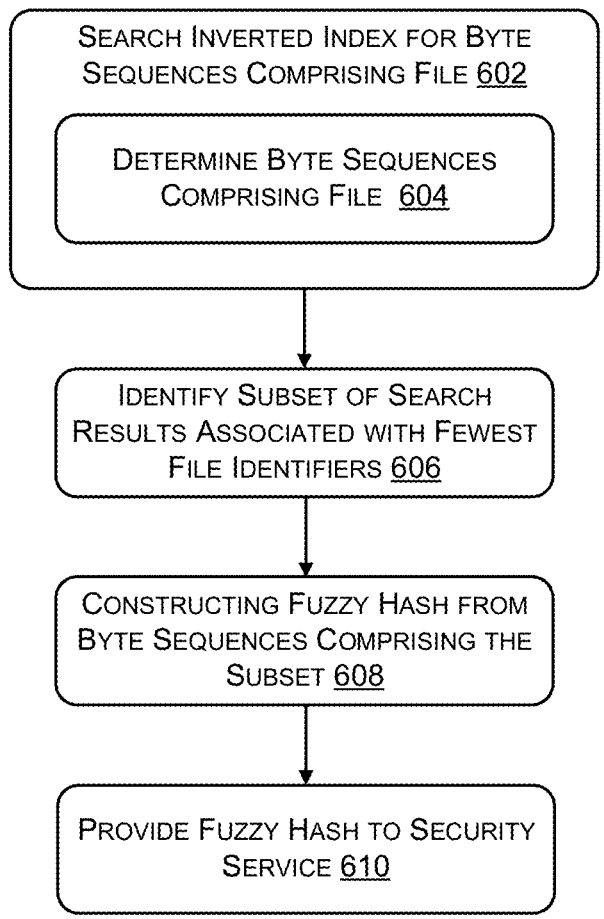
FIG. 6 illustrates example operations associated with the binary search engine, including searching for byte sequences that comprise a file in an inverted index, identifying a subset of the search results associated with the fewest file identifiers, and constructing a fuzzy hash from the byte sequences comprising the subset.

FIG. 6 illustrates example operations associated with the binary search engine, including searching for byte sequences that comprise a file in an inverted index, identifying a subset of the search results associated with the fewest file identifiers, and constructing a fuzzy hash from the byte sequences comprising the subset.

The operations include, at 602, for each byte sequence of a fixed length comprising a file, searching by one or more processors an inverted index which specifies byte sequences of the fixed length and, for each specified byte sequence, file identifiers of files that include the specified byte sequence. In some implementations, the byte sequences of the fixed length are n-grams with a length of four bytes. At 604, the searching also includes determining the byte sequences of the fixed length comprising the file.

At 606, the one or more processors identify a subset of search results of the searching that are associated with the fewest file identifiers. The identifying may be based at least in part on a relatedness confidence threshold.

At 608, the one or more processors construct a fuzzy hash from byte sequences comprising the subset of the search results.

At 610, the one or more processors provide the fuzzy hash to a security service.

Further Illustrative Examples

Figure 7A:
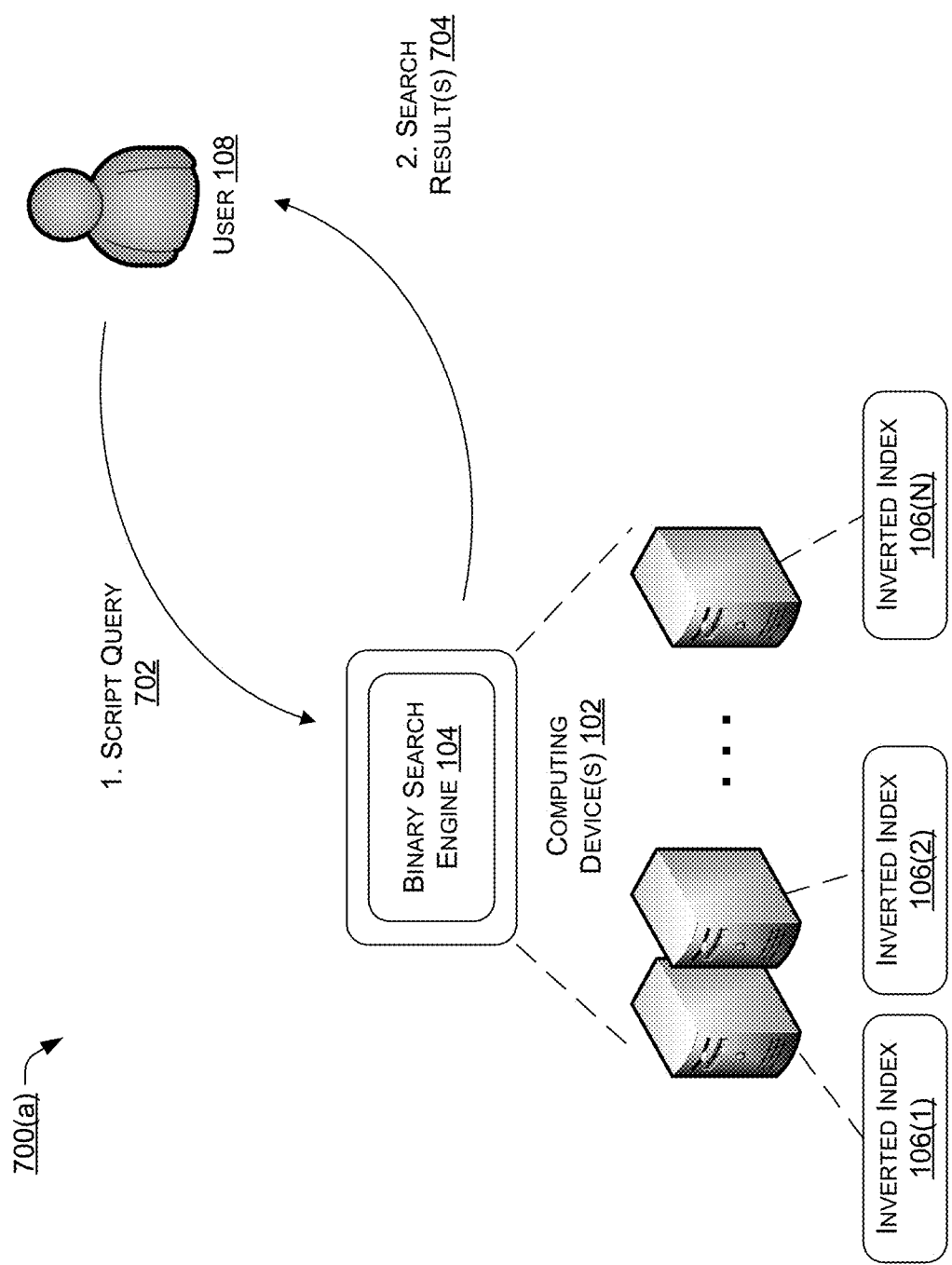
FIG. 7a illustrates an example system of computing device(s) configured with a binary search engine and an inverted index that may search the contents of binary files including searching with a query language as the search expression.
Figure 7B:
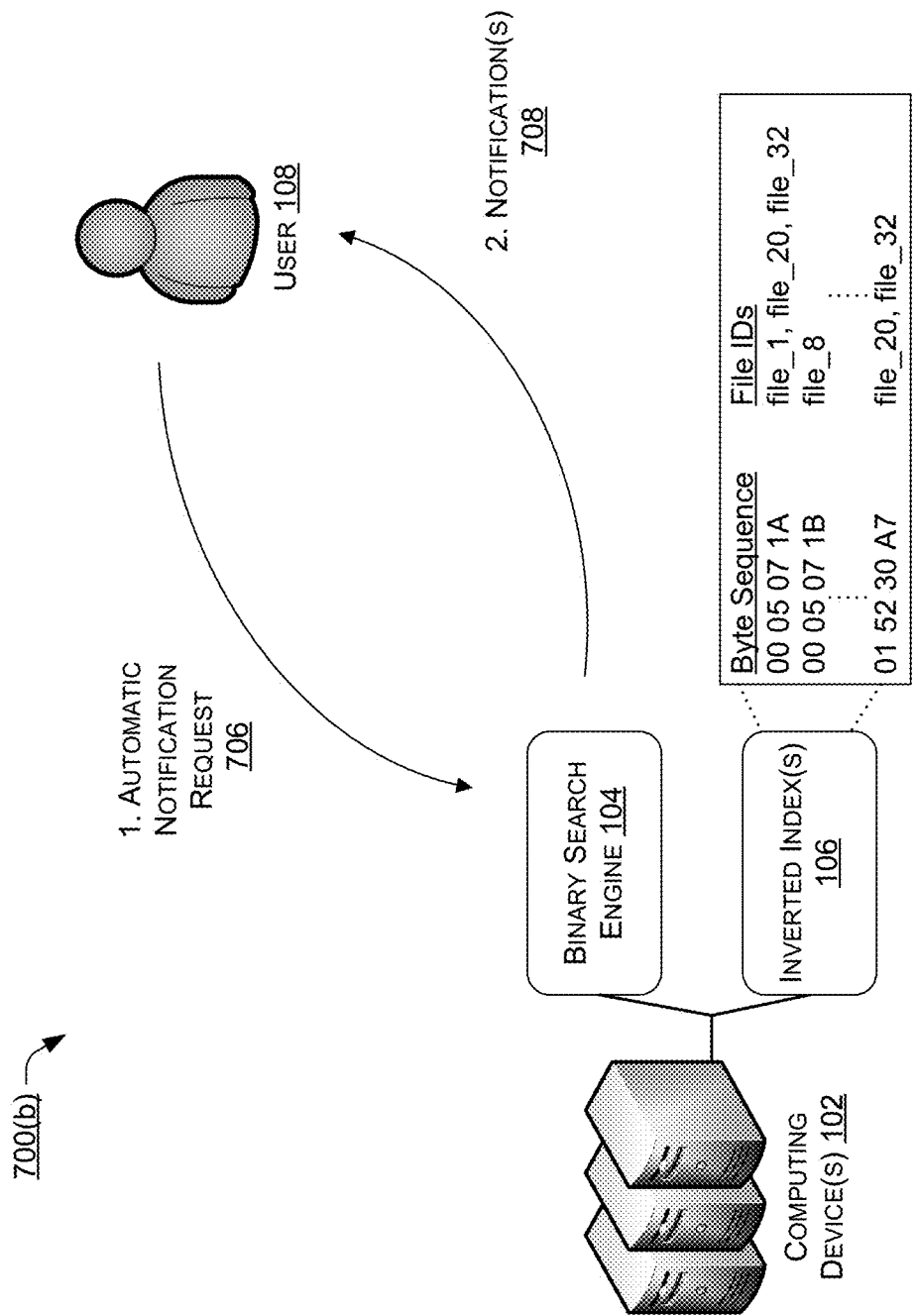
FIG. 7b illustrates an example system of computing device(s) configured with a binary search engine and an inverted index that may search the contents of binary files in response to receiving an automatic notification request.

FIGS. 7a and 7b illustrates an example system 700(a) and example system 700(b), collectively referred herein with reference 700, that may include one or more computing device(s) 102 configured with a binary search engine 104 and an inverted index 106 that enable searching the contents of binary files, e.g., executable files. Some examples include searching using query language in the search expression. Additional examples include distributing the inverted index 106 across multiple computing devices 102. Some examples include searching in response to an automatic notification request.

As described above with respect to FIGS. 1a-1d, the binary search engine 104 and the inverted index(es) 106 may each be distributed among the computing device(s) 102 with modules of the binary search engine 104 distributed among the computing device(s) 102 and/or parts of the inverted index(es) 106 distributed among the computing device(s) 102. As illustrated in example system 700(a), the parts of the inverted index(es) 106 distributed among the computing device(s) 102 may include inverted index(es) 106(1)-106(N) (individually and/or collectively referred to herein with reference 106), where N is any integer greater than and/or equal to 2. For example, a first portion of the inverted index may be distributed on a first computing device, and the remaining portion of the inverted index may be distributed on a second computing device. In various implementations, the computing device(s) 102 running the binary search engine 104 may search the distributed inverted index(es) 106(1)-106(N) in parallel to reduce search time. For example, a first computing device 102(1) may be storing distributed inverted index 106(1), while a second computing device 102(2) may be storing distributed inverted index 106(2), and the search may be running on both first computing device 102(1) and second computing device 102(2) in parallel. The algorithm complexity of running the binary search engine 104 in parallel for computing device(s) 102 having the distributed inverted index(es) 106 is $O(1)$, while a traditional search through a collection of files is $O(n)$. Due to the algorithm complexity being $O(1)$, the performance of running binary search engine 104 in parallel on computing devices 102 with distributed inverted index(es) 106 does not depend on the amount of data that is indexed.

In various implementations, the distribution of the portions of inverted index(es) 106 across the computing device(s) 102 may be determined based on one or more distribution scheme including maximum data size per device or time-frame. For example, a distribution scheme based on maximum data size may distribute a first portion of the inverted index up to a predetermine data threshold on a first computing device, then distributing the next portion of the inverted index to the next computing device until the remaining portion(s) of the inverted index is distributed to a last computing device. The predetermined data threshold may be determined based on a hardware limitation or a search efficiency or a combination of the two. Under the maximum data size scheme, new additions to the inverted index may be added to the final computing device up to the predetermined data size, at which point, a new computing device may be added to receive new additions. In an additional example, a distribution scheme based on time-frame may distribute inverted index generated for files received during a first time frame on a first device and then distribute inverted index generated for files received during a second time frame on a second device.

Also described above with respect to FIGS. 1a-1d, the binary search engine 104 may be configured to accept any sort of query from a user, including, but not limited to, text/string query, structured query, and specific byte sequence query. In additional implementations, the binary search engine 104 or another component of the computing device(s) 102 may receive query 702 as a search expression from user 108. The query 702 may include one or more of: at least one rule; conditional search language; or at least one pattern-matching expression. Pattern-matching expressions can be expressed in a language corresponding to one or more query languages and/or regular-expression variants. The query languages or regular-expression variants may include languages that are specific to certain search tools, which may be defined by the tools' programmers, or that are general-purpose query languages, such as PCRE or XPath. The conditional search language may include one or more of: rules, conditional strings, Boolean operators, relational operators, nested statements, or "if" statements. The binary search engine 104 or component may be configured to interpret the conditional search language. For example, the binary search engine 104 may receive "or" or "|" as part of a search query, and may recognize both to be conditional "or." In another example, the binary search engine 104 or component may receive nested conditional search "'black' and 'white' and 'hat' and not 'striped'" as a search query, and may interpret the search as looking for files containing "black" and "white" and "hat" but not "striped."

In some implementations, the binary search engine 104 or another component of the computing device(s) 102 may be configured to support one or more anti-malware analyzing tools. Such malware-analyzing tools may or may not be developed by the same party as search tools described herein. Example malware-analyzing tools may include rules-based searching with custom malware signature. For example, the binary search engine or component may support malware scanning tools such as YARA or ClamAV, and may further recognize the language used by the tools such regular expressions, logical operators, substring-length or -position operators, set-membership operators, string-count operators, or operators for indexing into the contents a file, e.g., by the byte, word, dword, or other unit. Such support for scanning tools may be determined by and change according to community standards for sharing malware signature rules.

Accordingly, in various implementations, the binary search engine 104 or component may receive a search expression including a regular expression that defines a search pattern. The regular expression may include regular characters, with literal meaning, and metacharacters, with special meaning that may indicate a specific function based on the query language. For example, the metacharacters may include characters defining specific pattern matching syntax, quantifiers, conditions, grouping, wildcards, constants, sets of strings, and operator symbols, which denote operations over these sets. As a non-limiting example, if the binary search engine 104 or component receives "/ab(cd){2}/" as a search query, and the binary search engine 104 or component may process the "/" as a metacharacter indicating the beginning and the end of a regular expression; "( )" indicating a grouping; and "{2}" as matching exactly two times. The binary search engine 104 or component can therefore interpret the search query as searching for the term "abcdcd." In another example, if the binary search engine 104 or component receives "/hello (the|one) world/" as a search query, the binary search engine 104 or component may interpret the search query as having two search terms of "hello the world" and "hello one world," with an "or" conditional operator between those two search terms.

Additionally, the binary search engine 104 or component may receive and process the query 702 into one or more search terms and identify any conditional operator(s) that may be incorporated. After the query 702 has been processed as one or more search terms, the binary search engine 104 or component may then generate byte sequences of a fixed length from the search terms and may apply any conditional operator(s) that was identified. Additionally, as described above, with reference to syntax tree 122 or FIG. 1c, the binary search engine 104 or component may construct a syntax tree 122 based on any logical operator(s) identified. In some implementations, the binary search engine 104 or component may perform a validation operation before returning the search result(s) 704 to ensure that each file identified as a search result 704 satisfies the query 702. Furthermore, the binary search engine 104 may then take any of a number of further acts described with respect to FIGS. 1a-1d.

In various implementations, as illustrated in the example system 700(b), the binary search engine 104 or another component of the computing device(s) 102 may receive an automatic notification request 706 for a search query from user 108. The search query included with the automatic notification request 706 may be any query including but not limited to a text/string query, a structured query, a query for a specific byte sequence, or a query containing search rules as described for the query 702 illustrated in the example system 700(a). The automatic notification request 706 may include default settings for frequency of notification reporting and communication method for the notification.

In some implementations, the binary search engine 104 or component may receive additional input from user 108 specifying a frequency of notification reporting. The binary search engine 104 or component may have a default frequency setting and the user may elect to change the frequency setting. The frequency of notification reporting may be based on time including hourly, daily, weekly, bi-weekly, and monthly, or may be based on conditions including indexing one or more new files containing the search terms. For example, a weekly notification report may generate a report every week regardless if a new file was identified, while a conditional report may generate a report only in weeks in which a new file intersecting with the search query is found. In some implementations, e.g., if the frequency of notification reporting is based on a time longer than a day, the binary search engine 104 or component may trigger the search at night, or another suitable low traffic hour or low-load period, before reporting is due. If the frequency of notification reporting is based a condition such as indexing a new file, the binary search engine 104 or component may trigger the search after a new file has been processed and added to the inverted index. In additional implementations, if no new files have been added to the inverted index since the report was last generated, the search process may be skipped until the next reporting cycle. In various implementations, the reporting frequency may combine the condition of identifying a file with the search terms and reporting nightly, thus sending a report at a certain time based on positive search hits.

In additional implementations, the binary search engine 104 or another component of the computing device(s) 102 may receive additional input from user 108 specifying a method of communication for the notification or alert. Initially, the binary search engine 104 or other component may use the default communication setting that the user has already elected for current communication as the communication method for sending the notification 708. The binary search engine 104 or component may receive input from the user to change or set the communication method for the notifications or alerts 708. As a non-limiting example, the communication methods may utilize any communication channel, including one or more of an e-mail message, a website associated with a service provider, a text message, a push notification, a social network site, or an application that is associated with a service provider and is residing on a client device. In various implementations, more than one automatic notification request for the same user may be compiled into a single notification feed, and that notification feed can be pushed to the user as described above.

Figure 8:
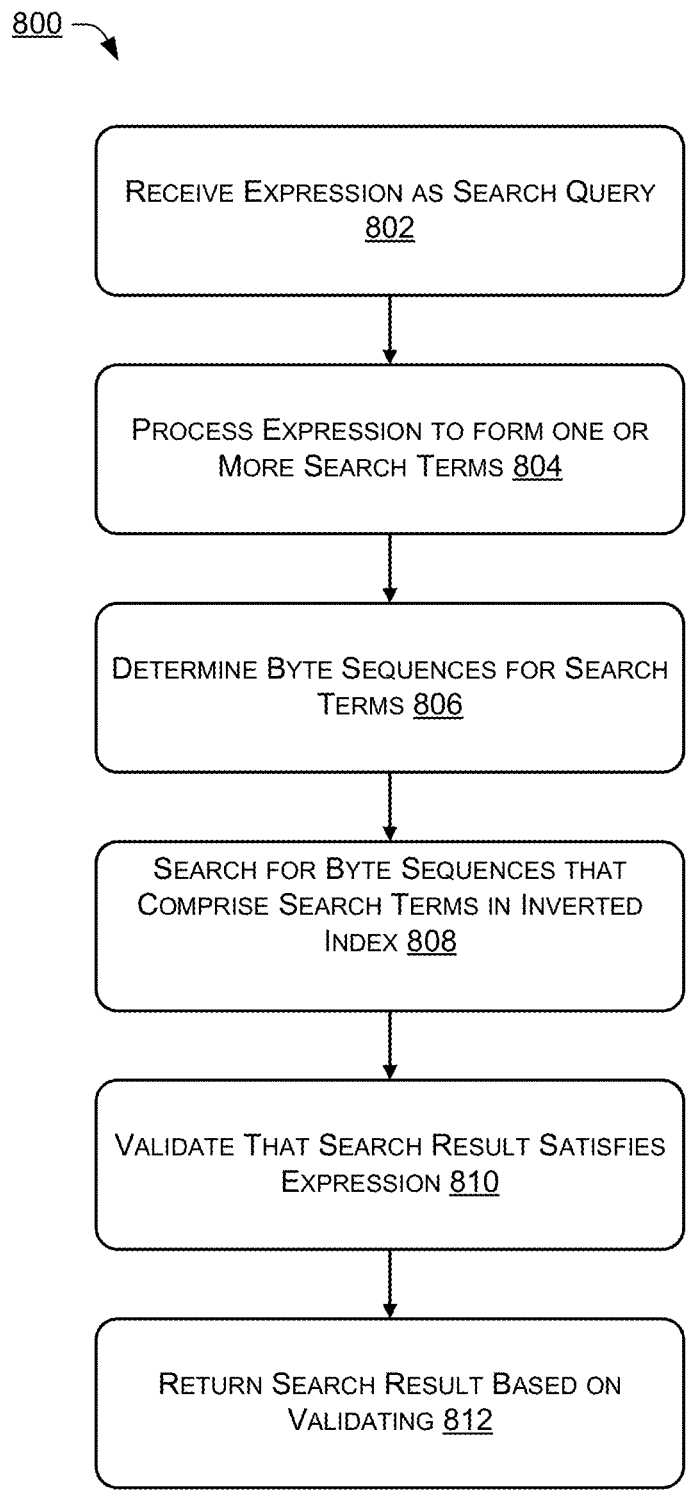
FIG. 8 is a flow diagram of an illustrative process associated with the binary search engine, including searching for byte sequences.
Figure 9:
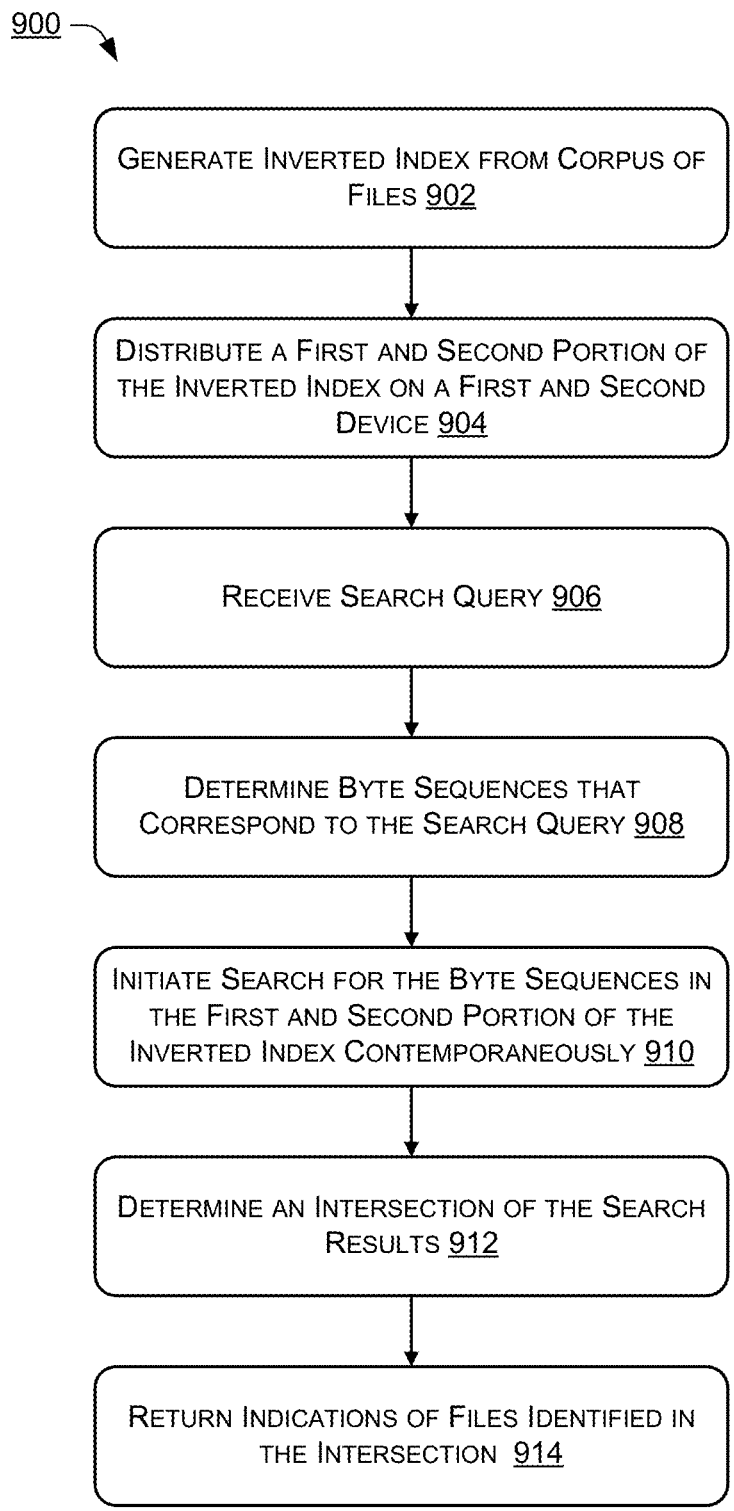
FIG. 9 is a flow diagram of an illustrative process associated with the binary search engine, including distributing portions of an inverted index to multiple devices and searching for byte sequences.
Figure 10:
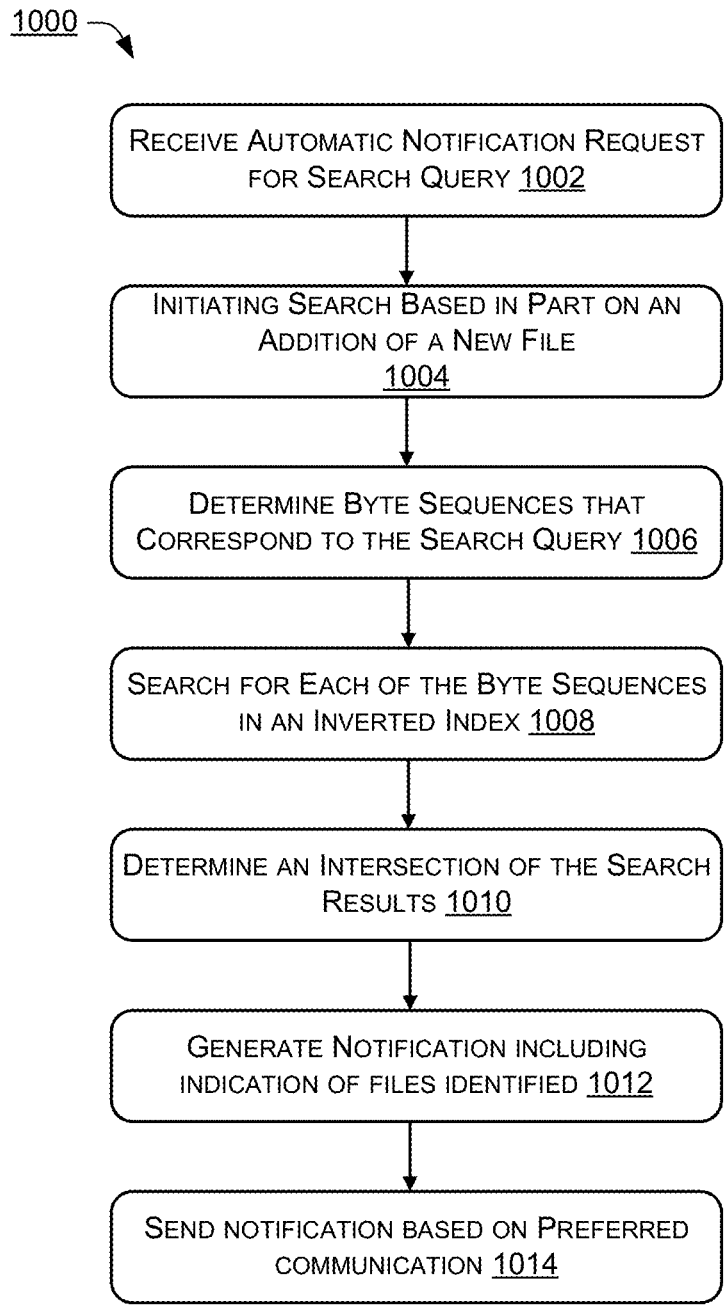
FIG. 10 is a flow diagram of an illustrative process associated with the binary search engine, including receiving an automatic notification request for a search query and searching for byte sequences that correspond to the search query.

In some examples, the processes of FIGS. 8-10 are implemented using computing device(s) 102 or 202, e.g., as discussed herein with reference to FIGS. 1a-2, 7a, or 7b, and example system 700. For example, the described operations can be carried out by processor(s) 214 under control of computer-executable instructions in system memory 204.

FIG. 8 is a flow diagram of an illustrative process 800 associated with the binary search engine, including receiving an expression as a search query, interpreting the expression into one or more search terms, searching for byte sequences corresponding to one or more search terms of the expression in an inverted index, evaluating the search results, and returning a search result based on the evaluation.

The operations include, at 802, receiving, by a system comprising one or more processors, an expression as a search query. The system may receive the search query on any communication interface presented to a user, including but not limited to a web interface or application console associated with a service provider. The expression may include one or more of scripting commands, rules, conditional search language, and pattern matching language corresponding to one or more programming language and/or regular expression.

At 804, the system may process expressions into one or more search terms. As described above with respect to the example system 700, the binary search engine 104 or another component of the computing device(s) 102 may determine if the expression includes query language or metacharacters, and may process the expression into one or more search terms according to the query language(s), regular expression(s), or other expression format(s) supported by the system. The system may also interpret conditional search language or search rules and apply any condition that may apply before conducting a search. The system may apply any conditional search language or search rules after searching for all the search terms.

At 806, the system may determine a plurality of byte sequences of a fixed length that correspond to the search terms. The process of determining the plurality of byte sequence is as described above, reference to FIGS. 1a-1d and 3.

At 808, the system may search for byte sequences that comprise interpreted search terms in inverted index. The process for searching is as described above, reference to FIGS. 1a-1d and 3.

At 810, the system may validate that the search results included in the intersection include the expression. In various examples, after identifying the files, the system may retrieve the file and verify that that the search terms were in the file. The process for validating is as described above, reference to FIGS. 1a-1d and 3.

At 812, the system may return those of the search results that were validated at 810 as including the expression. For example, the search results can be transmitted via a network, or presented via a user interface.

FIG. 9 is a flow diagram of an illustrative process 900 associated with the binary search engine, including distributing portions of an inverted index to multiple devices, receiving a search query, searching for byte sequences corresponding to the search query in the distributed inverted indices in parallel across the multiple devices, evaluating the search results, and returning a search result based on the evaluation.

At 902, the binary search engine 104 or another component of the computing device(s) 102 may generate an inverted index from a corpus of files, such as a corpus of malware files. The process for generating an inverted index is as described above, reference to FIGS. 1a-1d and 3. The binary search engine 104 or component can index any kind of binary files: documents, executables, images, etc. The generating may include operations of specifying byte sequences or file identifiers, such as operations described above for those purposes. In some implementations, the byte sequences of the fixed length are n-grams with a length of four bytes.

At 904, the binary search engine 104 or component may distribute a first portion of the inverted index on a first computing device and a remaining portion on a second computing device. As described above with respect to example system 700, the binary search engine 104 or components may distribute the inverted index according to one or more distribution schemes including a maximum data size per device or time-frame. For example, a distribution scheme based on maximum data size may distribute a first portion of the inverted index up to a predetermine data threshold on a first computing device, then distributing the next portion of the inverted index to the next computing device until the remaining portion(s) of the inverted index is distributed to a last computing device. The predetermine data threshold may be determined based on a hardware limitation or search efficiency or a combination of the two. In an additional example, a distribution scheme based on time-frame may distribute a first portion of the inverted index generated during a first time-frame on a first computing device, then distributing a second portion of the inverted index generated during a second time-frame to the second computing device, and so on.

At 906, the binary search engine 104 or component may receive a search query. The search query may be received on any communication interface presented to a user, including but not limited to a web interface or application console associated with a service provider. The search query may be any form of query including any combination of query as described above with respect to example system 700, such as query languages, rules, and conditions.

At 908, the binary search engine 104 or component may determine a plurality of byte sequences of a fixed length that correspond to the search query. The process for determining byte sequences is as described above, reference to FIGS. 1a-1d and 3.

At 910, the binary search engine 104 or component may conduct search on the first and second computing device, e.g., in series or contemporaneously, for the byte sequences in the first and second portion of the inverted index. For example, the binary search engine 104 or component may, in order: initiate search on the first computing device; initiate search in the second computing device; receive search results from one of the first computing device and the second computing device; and receive search results from the other of the first computing device and the second computing device. Additionally, and/or alternatively, the binary search engine 104 or component may initiate search on the first and second computing devices substantially contemporaneously, and receive results from the first and second computing devices at a time after the initiation of search on both computing devices. The search on each machine may be conducted as discussed herein with reference to example system 700.

At 912, the binary search engine 104 or component may determine an intersection of search results of the searching. The process for determining the intersection is as described above, reference to FIGS. 1a-1d and 3. The binary search engine 104 or component may validate that the search results included in the intersection include the search query.

At 914, the binary search engine 104 or component may return those of the search results that were validated at 912 as including indications of files associated with file identifiers that are included in the intersection in response to the search query.

FIG. 10 is a flow diagram of an illustrative process 1000 associated with the binary search engine, including receiving an automatic notification request for a search query, performing search for byte sequences corresponding to that search query in an inverted index based on notification frequency, determining an intersection of the search results, generating a notification with indication of files identified in the intersection, and sending notification based on communication preference.

At 1002, the binary search engine 104 or another component of the computing device(s) 102 may receive an automatic notification request for a search query. The automatic notification request may be received from any communication interface presented to a user, including but not limited to a web interface or application console associated with a service provider. The search query may be any query as described above, with reference to FIGS. 1a-1d and the example system 700. The automatic notification request may be assigned a default notification frequency and communication method based on user's current preference.

At 1004, the binary search engine 104 or component may initiate a search based in part on an addition of a new file to the inverted index. As described above with reference to example system 700, a search may be triggered based on a notification frequency. However, if no new files have been added since the last notification was generated, a new search may not be needed at the next notification time. The binary search engine 104 or component may receive one or more new files to process and determine its status. Based on the status, the file may be associated with the inverted index, and a search based on the search query may be triggered.

At 1006, the binary search engine 104 or component may determine a plurality of byte sequences of a fixed length that correspond to the search query. The process for determining a plurality of byte sequences is as described above, reference to FIGS. 1a-d and 3.

At 1008, the binary search engine 104 or component may search for each of the byte sequences in the inverted index that specifies byte sequences of the fixed length and, for each specified byte sequence, retrieve identifiers of files that include the specified byte sequence. The process for searching for each of the byte sequences is as described above, reference to FIGS. 1a-d and 3.

At 1010, the binary search engine 104 or component may determine an intersection of search results of the searching. The process for determining an intersection is as described above, reference to FIGS. 1a-d and 3. The binary search engine 104 or component may validate that the search results included in the intersection include the search query, before generating any notification.

At 1012, the binary search engine 104 or component may generate notification including indication of files associated with file identifiers that are included in the intersection in response to the search query. As described above with respect to example system 700, the binary search engine 104 or component may generate the notification in a format according to the preferred communication, e.g., RSS or Atom formats.

At 1014, the binary search engine 104 or component may send notification based on preferred communication setting(s). As described above with respect to example system 700, the binary search engine 104 or component may use the default communication setting that the user has already elected for current communication as the communication method for sending the notification. The binary search engine 104 or component may receive input from the user to change or set the communication method for the notifications or alerts. In various implementations, the communication methods may utilize any communication channel, including one or more of an e-mail message, a website associated with a service provider, a text message, a push notification, a social network site, or an application that is associated with a service provider and is residing on a client device.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A system comprising: one or more processors; and programming instructions configured to be executed by the one or more processors to perform operations including: receiving a search query; determining a plurality of byte sequences of a fixed length that correspond to the search query; searching for each of the byte sequences in an inverted index that specifies byte sequences of the fixed length and, for each specified byte sequence, file identifiers of files that include the specified byte sequence; determining an intersection of search results of the searching; and returning indications of files associated with file identifiers that are included in the intersection in response to the search query.

B: The system of paragraph A, wherein the operations further include generating the inverted index from a corpus of files, the generating including specifying at least a subset of byte sequences of the fixed length found in at least one file of the corpus of files and, for each byte sequence in the subset of byte sequences, file identifiers of one or more files in the corpus of files that include that byte sequence.

C: The system of paragraph B, wherein the corpus of files is a corpus of malware files.

D: The system of any of paragraphs A-C, wherein the files are binary files or executable files.

E: The system of any of paragraphs A-D, wherein the system includes a plurality of computing devices and the one or more processors, execution of the programming instructions, and inverted index are distributed across the computing devices.

F: The system of any of paragraphs A-E, wherein the byte sequences of the fixed length are n-grams with a length of four bytes.

G: The system of any of paragraphs A-F, wherein the operations further include validating that the search results included in the intersection include the search query before returning the indications.

H: A computer implemented method comprising: for each byte sequence of a fixed length comprising a file, searching an inverted index which specifies byte sequences of the fixed length and, for each specified byte sequence, file identifiers of files that include the specified byte sequence, wherein each file identifier is associated with a security status; based on results of the search, creating a list of candidate byte sequences, wherein the candidate byte sequences are only found in files with file identifiers that are associated with a malware status or an unknown status; selecting ones of the candidate byte sequences that are associated with the most file identifiers; and generating a signature from selected ones of the candidate byte sequences.

I: The method of paragraph H, wherein the byte sequences of the fixed length are n-grams with a length of four bytes.

J: The method of paragraph H or I, wherein the searching further comprises determining the byte sequences of the fixed length comprising the file.

K: The method of any of paragraphs H-J, wherein the security status associated with each file identifier is one of a malware status, a clean status, an unknown status, or another status indicating a level of trust.

L: The method of any of paragraphs H-K, wherein the searching further comprises filtering out byte sequences known to be found in files with file identifiers associated with a clean status and searching for the remaining byte sequences comprising the file.

M: The method of any of paragraphs H-L, wherein the creating further comprises determining a security status for each file identifier returned from the search, the security status being metadata for the file identifier.

N: The method of any of paragraphs H-M, further comprising providing the signature to a security service.

O: A computer-implemented method comprising: receiving an expression as a search query, the expression including at least one logical operator and at least two search terms; searching for byte sequences of a fixed length that comprise each of the search terms in an inverted index which specifies byte sequences of the fixed length and, for each specified byte sequence, file identifiers of files that include the specified byte sequence; evaluating results of the searching using a syntax tree constructed from the at least one logical operator; and returning a search result to the search query based on the evaluating.

P: The method of paragraph O, wherein the byte sequences of the fixed length are n-grams with a length of four bytes.

Q: The method of paragraph O or P, wherein the searching further comprises determining a plurality of byte sequences of a fixed length that correspond to each search term.

R: The method of any of paragraphs O-Q, further comprising constructing the syntax tree based on the at least one logical operator, wherein the search terms are evaluated as leaves of the syntax tree, each leaf comprising one or more byte sequences associated with one of the search terms.

S: The method of any of paragraphs O-R, further comprising, before performing the returning, validating that a file corresponding to the search result satisfies the expression.

T: One or more non-transitory computer-readable media having stored thereon programming instructions that, when executed by one or more processors, cause the one or more processors to perform operations including: for each byte sequence of a fixed length comprising a file, searching an inverted index which specifies byte sequences of the fixed length and, for each specified byte sequence, file identifiers of files that include the specified byte sequence; identifying a subset of search results of the searching that are associated with the fewest file identifiers; and constructing a fuzzy hash from byte sequences comprising the subset of the search results.

U: The one or more non-transitory computer-readable media of paragraph T, wherein the byte sequences of the fixed length are n-grams with a length of four bytes.

V: The one or more non-transitory computer-readable media of paragraph T or U, wherein the searching further comprises determining the byte sequences of the fixed length comprising the file.

W: The one or more non-transitory computer-readable media of any of paragraphs T-V, wherein the identifying is based at least in part on a relatedness confidence threshold.

X: The one or more non-transitory computer-readable media of any of paragraphs T-W, wherein the operations further comprise providing the fuzzy hash to a security service.

Y: A system comprising: one or more processors; and programming instructions configured to be executed by the one or more processors to perform operations including: receiving an expression as a search query, the expression including at least one of a rule statement or one or more metacharacters, wherein the one or more metacharacters includes one or more characters defined with one or more specific functions; interpreting the expression into one or more search terms; searching for byte sequences that comprise the one or more search terms in an inverted index which specifies byte sequences of the fixed length and, for specified byte sequence of the byte sequences, file identifiers of files that include the specified byte sequence; evaluating results of the searching based on the expression; and returning a search result to the search query based on the evaluating.

Z: The system of paragraph Y, wherein the expression includes the rule statement with one or more logical operators, and wherein the operations further comprise: constructing a syntax tree from the one or more logical operators; and evaluating the results using the syntax tree.

AA: The system of paragraph Z, wherein the operations further include constructing the syntax tree based on the one or more logical operators, wherein the one or more search terms are evaluated as leaves of the syntax tree, each leaf comprising one or more byte sequences associated with one of the one or more search terms.

AB: The system of any of paragraphs Y-AA, wherein the expression includes at least one metacharacter defining a grouping function, and wherein interpreting the expression into one or more search terms includes applying the grouping function to a text string portion of the expression.

AC: The system of any of paragraphs Y-AB, wherein the expression includes at least one metacharacter defining a search pattern function, and wherein interpreting the expression into one or more search terms includes applying the search pattern function to a text string portion of the expression.

AD: The system of any of paragraphs Y-AC, wherein the system includes a plurality of computing devices and the one or more processors, execution of the programming instructions, and inverted index are distributed across the plurality of computing devices.

AE: The system of any of paragraphs Y-AD, wherein the operations further include, before performing the returning, validating that a file corresponding to the search result satisfies the expression.

AF: A computer implemented method comprising: generating an inverted index that specifies byte sequences from a corpus of files; distributing a first portion of the inverted index to a first computing device and a remaining portion of the inverted index to a second computing device; receiving a search query; determining a plurality of byte sequences that correspond to the search query; searching for individual byte sequences of the plurality of byte sequences in the inverted index, wherein searching for the individual byte sequences includes contemporaneously: conducting a first search on the first computing device to provide first search results; and conducting a second search on the second computing device to provide second search results; determining third search results as an intersection of the first search results and the second search results; and returning indications of files associated with file identifiers that are included in the third search results, in response to the search query.

AG: The method of paragraph AF, further including validating that the search results included in the intersection include the search query before returning the indications.

AH: The method of paragraph AF or AG, wherein the searching further comprises determining the files includes the byte sequences.

AI: The method of any of paragraphs AF-AH, wherein the corpus of files is a corpus of malware files.

AJ: The method of any of paragraphs AF-AI, wherein the files are binary files or executable files.

AK: The method of any of paragraphs AF-AJ, wherein the byte sequences of the fixed length are n-grams with a length of four bytes.

AL: The method of any of paragraphs AF-AK, wherein generating the inverted index includes specifying at least a subset of byte sequences of the fixed length found in at least one file of the corpus of files and, for each byte sequence in the subset of byte sequences, file identifiers of one or more files in the corpus of files that include that byte sequence.

AM: A computer-implemented method comprising: receiving an automatic notification request including a search query; initiating a search based at least in part on addition of one or more new files to an inverted index; determining a plurality of byte sequences of a fixed length that correspond to the search query; searching for each of the byte sequences in the inverted index that specifies byte sequences of the fixed length and, for each specified byte sequence, file identifiers of files that include the specified byte sequence; determining an intersection of search results of the searching; and generating a notification message indicating the files associated with file identifiers that are included in the intersection in response to the search query.

AN: The method of paragraph AM, wherein the automatic notification request further includes a notification frequency, and wherein initiating the search includes running the search at the notification frequency.

AO: The method of paragraph AM or AN, wherein the automatic notification request further includes a notification criterion for identifying at least one new file intersecting with the search query.

AP: The method of any of paragraphs AM-AO, further comprising validating that the search results included in the intersection include the search query.

AQ: The method of paragraph AP, wherein the automatic notification request further includes a preferred communication method selected from one or more of an email, a push notification, a text message, a website, or an application, and further comprising sending the notification message by the preferred communication method.

AR: The method of any of paragraphs AM-AQ, wherein the automatic notification request further includes a notification criterion for identifying at least one new file intersecting with the search query, and the method further comprises: determining that the notification criterion has been satisfied; and in response, sending the notification message.

AS: A computer-readable medium, e.g., a computer storage medium, having thereon computer-executable instructions, the computer-executable instructions upon execution configuring a computer to perform operations as any of paragraphs H-S, AF-AL, or AM-AR recites.

AT: A device comprising: a processor; and a computer-readable medium, e.g., a computer storage medium, having thereon computer-executable instructions, the computer-executable instructions upon execution by the processor configuring the device to perform operations as any of paragraphs H-S, AF-AL, or AM-AR recites.

AU: A system comprising: means for processing; and means for storing having thereon computer-executable instructions, the computer-executable instructions including means to configure the system to carry out a method as any of paragraphs H-S, AF-AL, or AM-AR recites.

Conclusion

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

This disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

Some operations of example processes or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium (e.g., computer storage medium) that, when executed by one or more processors, cause or enable the one or more processors to perform the recited operations. Generally, computer-executable instructions include routines, programs, objects, modules, code segments, components, data structures, and the like that perform particular functions or implement particular abstract data types.

Accordingly, the methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more computing devices 102, such as one or more internal or external CPUs or GPUs, or one or more pieces of hardware logic such as FPGAs, DSPs, or other types of accelerators.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors; and
   programming instructions configured to be executed by the one or more processors to perform operations including:
      receiving an expression as a search query, the expression including at least one of a rule statement or one or more metacharacters, wherein the one or more metacharacters includes one or more characters defined with one or more specific functions;
      interpreting the expression into one or more search terms;
      determininq one or more target byte sequences of a fixed length that correspond to respective search terms of the one or more search terms;
      searching for the one or more target byte sequences in an inverted index, wherein the inverted index maps a plurality of byte sequences of the fixed length to one or more file identifiers of files that include individual ones of the plurality of byte sequences;
      evaluating results of the searching based on the expression; and
      returning a search result to the search query based on the evaluating.

2. The system of claim 1, wherein the expression includes the rule statement with one or more logical operators, and wherein the operations further comprise:
   constructing a syntax tree from the one or more logical operators; and
   evaluating the results using the syntax tree.

3. The system of claim 2, wherein the operations further include constructing the syntax tree based on the one or more logical operators, wherein the one or more search terms are evaluated as leaves of the syntax tree, each leaf comprising one or more byte sequences associated with one of the one or more search terms.

4. The system of claim 1, wherein the expression includes at least one metacharacter defining a grouping function, and wherein interpreting the expression into one or more search terms includes applying the grouping function to a text string portion of the expression.

5. The system of claim 1, wherein the expression includes at least one metacharacter defining a search pattern function, and wherein interpreting the expression into one or more search terms includes applying the search pattern function to a text string portion of the expression.

6. The system of claim 1, wherein the system includes a plurality of computing devices and the one or more processors, execution of the programming instructions, and inverted index are distributed across the plurality of computing devices.

7. The system of claim 1, wherein the operations further include, before performing the returning, validating that a file corresponding to the search result satisfies the expression.

8. One or more non-transitory computer-readable media storing computer-executable instructions that, when executed by one or more processors, cause the one or more processors to perform operations comprising:
   receiving an expression as a search query, the expression including at least one of a rule statement or one or more metacharacters, wherein the one or more metacharacters includes one or more characters defined with one or more specific functions;
   interpreting the expression into one or more search terms;
   determininq one or more target byte sequences of a fixed length that correspond to respective search terms of the one or more search terms;
   searching for the one or more target byte sequences in an inverted index, wherein the inverted index maps a plurality of byte sequences of the fixed length to one or more file identifiers of files that include individual ones of the plurality of byte sequences;
   evaluating results of the searching based on the expression; and
   returning a search result to the search query based on the evaluating.

9. The one or more non-transitory computer readable media of claim 8, wherein the expression includes the rule statement with one or more logical operators, and wherein the operations further comprise:
   constructing a syntax tree from the one or more logical operators; and
   evaluating the results using the syntax tree.

10. The one or more non-transitory computer readable media of claim 9, wherein the operations further include constructing the syntax tree based on the one or more logical operators, wherein the one or more search terms are evaluated as leaves of the syntax tree, each leaf comprising one or more byte sequences associated with one of the one or more search terms.

11. The one or more non-transitory computer readable media of claim 8, wherein the expression includes at least one metacharacter defining a grouping function, and wherein interpreting the expression into one or more search terms includes applying the grouping function to a text string portion of the expression.

12. The one or more non-transitory computer readable media of claim 8, wherein the expression includes at least one metacharacter defining a search pattern function, and wherein interpreting the expression into one or more search terms includes applying the search pattern function to a text string portion of the expression.

13. The one or more non-transitory computer readable media of claim 8, wherein a system includes a plurality of computing devices and the one or more processors, execution of the computer-executable instructions, and inverted index are distributed across the plurality of computing devices.

14. The one or more non-transitory computer readable media of claim 8, wherein the operations further include, before performing the returning, validating that a file corresponding to the search result satisfies the expression.

15. A computer-implemented method comprising:
receiving an expression as a search query, the expression including at least one of a rule statement or one or more metacharacters, wherein the one or more metacharacters includes one or more characters defined with one or more specific functions;
interpreting the expression into one or more search terms;
determining one or more target byte sequences of a fixed length that correspond to respective search terms of the one or more search terms;
searching for the one or more target byte sequences in an inverted index, wherein the inverted index maps a plurality of byte sequences of the fixed length to one or more file identifiers of files that include individual ones of the plurality of byte sequences;
evaluating results of the searching based on the expression; and
returning a search result to the search query based on the evaluating.

16. The method of claim 15, wherein the expression includes the rule statement with one or more logical operators, and wherein the method further comprises:
constructing a syntax tree from the one or more logical operators; and
evaluating the results using the syntax tree.

17. The method of claim 16, wherein the method further comprises constructing the syntax tree based on the one or more logical operators, wherein the one or more search terms are evaluated as leaves of the syntax tree, each leaf comprising one or more byte sequences associated with one of the one or more search terms.

18. The method of claim 15, wherein the expression includes at least one metacharacter defining a grouping function, and wherein interpreting the expression into one or more search terms includes applying the grouping function to a text string portion of the expression.

19. The method of claim 15, wherein the expression includes at least one metacharacter defining a search pattern function, and wherein interpreting the expression into one or more search terms includes applying the search pattern function to a text string portion of the expression.

20. The method of claim 15, wherein a plurality of computing devices comprising one or more processors execute of programming instructions to perform the method, and the inverted index is distributed across the plurality of computing devices.

* * * * *